United States Patent [19]
Konoya et al.

[11] Patent Number: 5,614,808
[45] Date of Patent: Mar. 25, 1997

[54] ELECTRIC VEHICLE CHARGING CONNECTOR, CONNECTOR ASSEMBLY AND ELECTRIC VEHICLE CHARGING SYSTEM

[75] Inventors: Hisashi Konoya; Heiji Kuki, both of Mie Pref., Japan

[73] Assignee: Sumitomo Wiring Systems, Ltd., Japan

[21] Appl. No.: 238,740

[22] Filed: May 5, 1994

[30] Foreign Application Priority Data

May 10, 1993 [JP] Japan .................................. 5-132860

[51] Int. Cl.⁶ .................................................. H02J 7/00
[52] U.S. Cl. ............................................... 320/48; 320/2
[58] Field of Search ........................ 320/48, 2; 439/259, 439/261, 271, 277, 296, 312, 317, 338, 341, 374

[56] References Cited

U.S. PATENT DOCUMENTS

| | | | |
|---|---|---|---|
| 3,904,947 | 9/1975 | Crews | 320/2 |
| 4,052,655 | 10/1977 | Vizza | 320/2 |
| 4,193,655 | 3/1980 | Hermann, Jr. | 339/31 |
| 4,560,937 | 12/1985 | Finger | 324/433 |
| 4,629,272 | 12/1986 | Mattingly et al. | 339/90 R |
| 5,119,011 | 6/1992 | Lambert | 320/48 X |
| 5,138,351 | 8/1992 | Wiegand et al. | 354/81 |
| 5,229,704 | 7/1993 | Knepper | 320/2 |
| 5,230,637 | 7/1993 | Weber | 439/504 |
| 5,237,257 | 8/1993 | Johnson et al. | 320/48 X |
| 5,283,513 | 2/1994 | Fujita et al. | 320/56 |
| 5,346,406 | 9/1994 | Hoffman et al. | 439/474 |
| 5,350,312 | 9/1994 | Kuno et al. | 439/310 |
| 5,424,722 | 6/1995 | Inada et al. | 340/636 |

FOREIGN PATENT DOCUMENTS 4-334908  11/1992  Japan .

*Primary Examiner*—Peter S. Wong
*Assistant Examiner*—K. Shin
*Attorney, Agent, or Firm*—Wenderoth, Lind & Ponack

[57] ABSTRACT

An electric vehicle charging connector used for charging a power battery of an electric vehicle includes connector holder and a display section mounted in an upper portion of the connector holder. The display section includes red and green light-emitting diodes and a seven-segment two-digit numeric display including light-emitting diodes. The red light-emitting diode is turned on while the power battery is being charged. The green light-emitting diode is turned on instead of the red light-emitting diode when charging has been completed. Either the time elapsed after the charging operation has been initiated or the remaining capacity of the power battery is displayed by the numeric display.

14 Claims, 5 Drawing Sheets

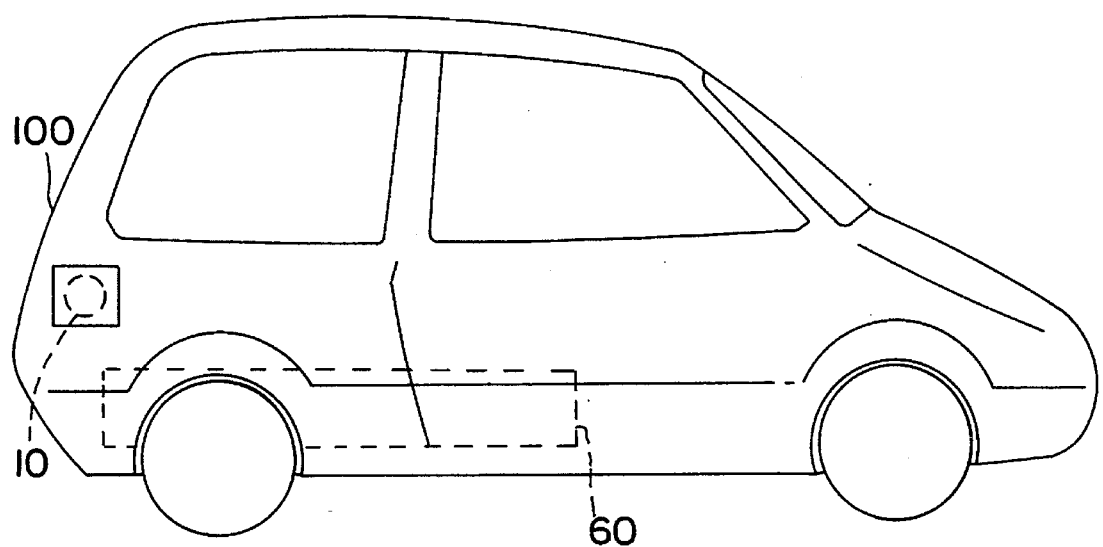
FIG. 5
FULL –
EMPTY –
FIG. 6        FIG. 7

ELECTRIC VEHICLE CHARGING CONNECTOR, CONNECTOR ASSEMBLY AND ELECTRIC VEHICLE CHARGING SYSTEM

BACKGROUND OF THE INVENTION

1. Field of the Invention

This invention relates to an electric vehicle charging connector and an assembly including the connector and a vehicle side connector engaged thereby in charging a power battery of an electric vehicle, as well as to an electric vehicle charging system employing the electric vehicle charging connector assembly.

2. Description of the Prior Art

A power battery provided in a body of an electric vehicle needs to be frequently charged and accordingly, an external charging power source needs to be readily connected to the power battery of the electric vehicle. For this purpose, a vehicle side connector is conventionally mounted on the body of the electric vehicle, and an electrical connector connected to a power source is connected to the vehicle side connector so that the power battery can be charged.

However, the connector of the above-described type only functions to electrically connect a power battery charging circuit provided in the body of the electric vehicle to the external charging power source. Accordingly, a user or a driver cannot obtain, from the connector itself, information as to whether the power battery is being charged, information as to how long it will take for the power battery to be fully charged, information as to the remaining capacity of the power battery, or the like.

The information as described above may be displayed on a control panel of an external battery charger or an instrument panel of the electric vehicle. However, it is desirable, from the viewpoint of the charging operation, that the information be obtained at the charging connector itself. Furthermore, because charging the power battery of the electric vehicle is carried out more frequently than the fueling of a gasoline-powered automobile, the battery of the electric vehicle is charged via a cable from a commercial power source provided at the home of an owner of the electric vehicle rather than at a charge station. Because the battery charger is not located outside of the vehicle in such a case, it is further desirable for the charging connector to provide the information concerning the charging conditions.

SUMMARY OF THE INVENTION

Therefore, an object of the present invention is to provide an electric vehicle charging connector assembly which provides information concerning the charging conditions and to provide an electric vehicle charging system employing this connector assembly.

To achieve this object, the present invention provides an electric vehicle charging connector assembly wherein an external connector housing, to be mated with a vehicle side connector mounted on the body of the electric vehicle, includes a display section displaying information about the charging of the power battery of the electric vehicle. More specifically, the electric vehicle charging connector assembly of the present invention comprises a vehicle side connector housing provided on the body of the electric vehicle, vehicle side electrodes enclosed in the vehicle side connector housing, a grip handle having a cavity therein and being capable of being gripped by an operator, the grip handle comprising an upper half portion, a lower half portion and an end, an external connector housing provided on the end of the grip handle and capable of being mated with and unmated from the vehicle side connector housing, external electrodes enclosed in the external connector housing to be electrically connected to the respective vehicle side electrodes when the external connector housing is mated with the vehicle side connector housing, a charging information detecting circuit detecting information about charging of the power battery, a power cable connected to the external electrodes, the power cable extending through the cavity of the grip handle from the external electrodes and out of the lower half portion of the grip handle, and a display section provided the upper half portion of the grip handle for displaying the information about charging of the power battery detected by the charging information detecting circuit.

The invention also provides an electric vehicle charging system charging a power battery provided in a body of an electric vehicle from an external commercial power source, thereby powering the electric vehicle. The system comprises a rectifier circuit rectifying an alternating current from the commercial power source, a voltage detecting circuit detecting a terminal voltage of the power battery, thereby generating a signal indicative of the detected terminal voltage, a charge control circuit controlling an operation of the rectifier circuit on the basis of the signal from the voltage detecting circuit, thereby controlling charging to the power battery, a vehicle side connector housing provided on the body of the electric vehicle, vehicle side electrodes enclosed in the vehicle side connector housing, an external connector housing mated with and unmated from the vehicle side connector housing, external electrodes enclosed in the external connector housing to be electrically connected to the respective vehicle side electrodes when the external connector housing is mated with the vehicle side connector housing, a charging information detecting circuit detecting information about charging of the power battery, and a display section provided in the external connector housing for displaying the information about charging of the power battery detected by the charging information detecting circuit.

According to the above-described charging connector assembly and the charging system, the display section displays the information as to whether the power battery is being charged or not, as to how long it takes for the power battery to be full charged, as to how much the remaining capacity of the power battery is, or the like. Since a person engaging in the charging work can readily obtain the information, he or she need not view the control panel of the battery charger or get into the electric vehicle to view the instrument panel so that the information is obtained. The present invention thus provides for convenience.

BRIEF DESCRIPTION OF THE DRAWINGS

Other objects, features and advantages of the present invention will become clear upon reviewing the following description of a preferred embodiment thereof, made with reference to the accompanying drawings, in which:

FIG. 5 is a schematic side view of an electric vehicle;

FIG. 6 is a plan view of a display section of a modified form of the electric vehicle charging connector assembly; and FIG. 7 is a plan view of a display section of another modified form of the electric vehicle charging connector assembly.

DETAILED DESCRIPTION OF THE PREFERRED EMBODIMENT

One embodiment of the present invention will be described with reference to FIGS. 1 to 5. FIG. 5 schematically illustrates the structure of an electric vehicle. A power battery 60 is mounted in a body 100 of the electric vehicle. A vehicle side connector 10 is mounted on one side of the body 100.

Figure 1:
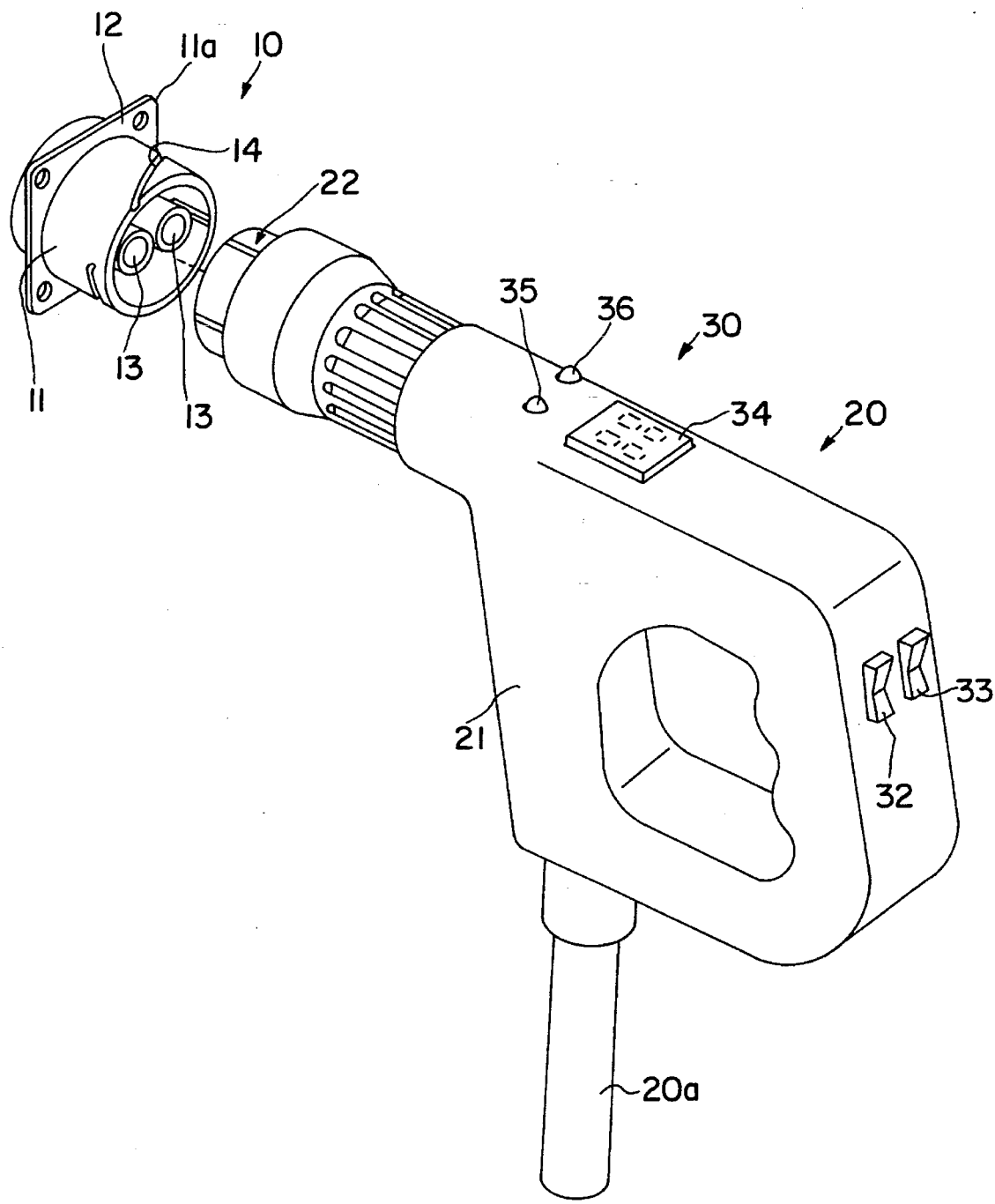
FIG. 1 is a perspective view of one embodiment of an electric vehicle charging connector assembly in accordance with the present invention.

Referring to FIG. 1, the vehicle side connector 10 comprises a vehicle side connector housing 12 including a generally cylindrical guide 11 and a rectangular flange 11a formed integrally with the guide 11. The cylindrical guide 11 of the vehicle side connector housing 12 is open at its front end and has two spiral grooves 14 formed in an outer periphery of the open end thereof. A pair of cylindrical vehicle side electrodes 13 and a plurality of signal terminals (not shown in the figure) are located in the vehicle side connector housing 12. The vehicle side electrodes 13 are electrically connected to a power battery charging circuit 40 (see FIG. 3) of the electric vehicle.

Figure 2:
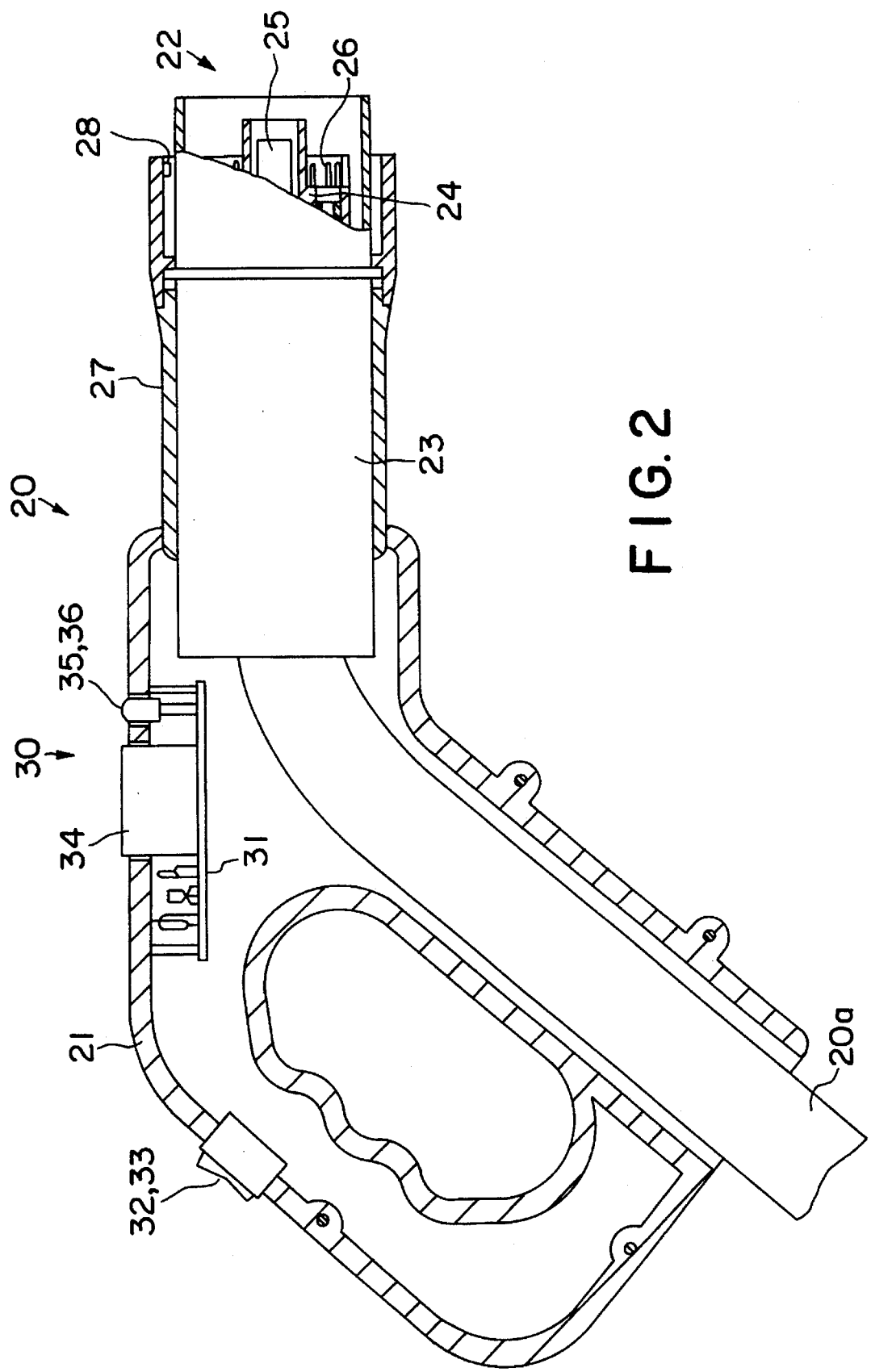
FIG. 2 is a longitudinal sectional view of an external connector of the electric vehicle charging connector assembly.
Figure 3:
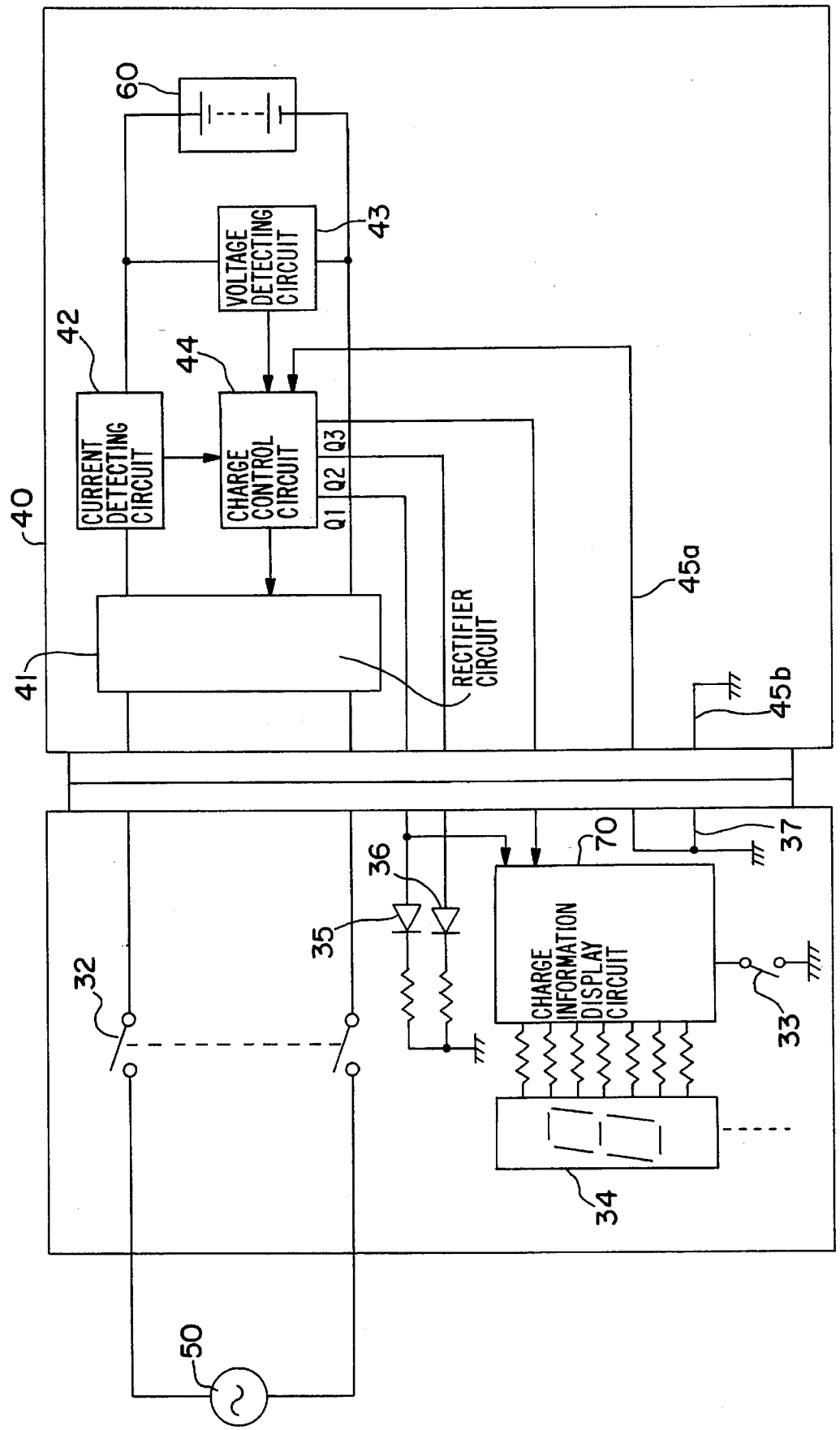
FIG. 3 is a block diagram of an electrical system of the electric vehicle charging connector assembly.
Figure 4:
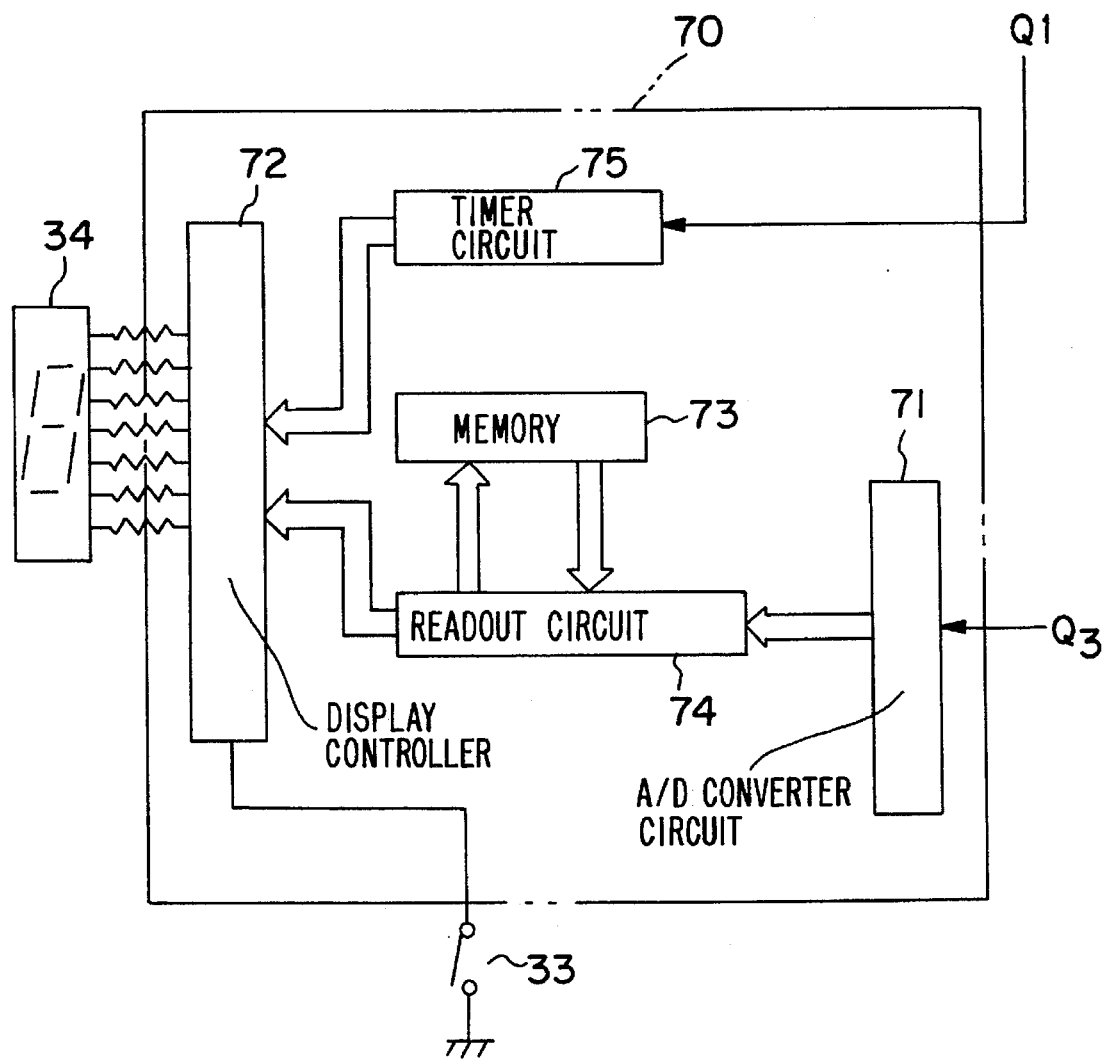
FIG. 4 is a block diagram of a charging information detecting circuit employed in the electric vehicle charging connector assembly.

A charging connector 20 is connected to an end of a charging cable 20a which is to be further connected to a household commercial power source 50 (shown only in FIG. 3). The charging connector 20 is mated with the vehicle side connector 10 when the power battery 60 of the electric vehicle is to be charged. The charging connector 20 generally in the shape of a gun comprises a generally frame-like grip handle or connector holder 21 including a cylindrical (hollow) portion through which the charging cable 20a extends, and a cylindrical external connector housing 22 disposed at a distal end of the holder 21. The charging cable 20a extends out of the bottom of the lower half of the connector holder 21. The external connector housing 22 includes a cylindrical inner casing 23, which is shown in FIG. 2. An insulator 24 is disposed in the vicinity of a front open end of the inner casing 23. A pair of external electrodes 25 extend within the insulator 24 in the external connector housing 22. When the inner casing 23 of the external connector housing 22 is inserted into the cylindrical guide 11 of the vehicle side connector 10, the external electrodes 25 of the charging connector 20 are fitted into the vehicle side electrodes 13 of the vehicle side connector 10 so as to be electrically connected to them, respectively. The external connector housing 22 also encloses a plurality of signal terminals 26 which are to be connected to the respective signal terminals of the vehicle side connector 10 to receive signals from the power battery charging circuit 40 provided in the body 100 of the electric vehicle.

The external connector housing 22 further includes a cylindrical sleeve 27 mounted on the outer periphery of the inner case 23. The sleeve 27 is prevented from moving axially relative to the inner casing 23 although it is rotatable. The sleeve 27 is shorter than the inner casing 23 and has an expanded distal end such that its diameter is larger at the expanded distal end than at the other portion thereof. The sleeve 27 is positioned outside the cylindrical guide 11 when the external connector housing 22 has been inserted in the vehicle side connector 10. An engagement pin 28 is formed on the inner periphery of a distal end of the sleeve 27 so as to project inward. The engagement pin 28 can be received in either spiral groove 14 of the cylindrical guide 11. When the engagement pin 28 received in either spiral groove 14 and the connector 20 is pressed toward the vehicle side connector 10, the engagement pin 28 is moved along the spiral groove 14 such that the sleeve 27 rotates and accordingly, the whole charging connector 20 is allowed to move axially toward the vehicle. The external connector housing 22 is completely mated with the vehicle side connector 10 when the sleeve 27 is full rotated in a clockwise direction until the engagement pin 28 is near a terminal end of the spiral groove 14. In this state, the terminals 26 of the external connector housing 22 are electrically connected to those of the vehicle side connector 10, respectively.

A display section 30 is provided in an upper portion of the connector holder 21 of the charging connector 20 for displaying information about the charging condition(s) of the electric vehicle. The display section 30 includes a circuit board 31 provided in the connector holder 21. A charge switch 32 and a display mode change-over switch 33 are provided in a rear surface of the connector holder 21. The display section 30 comprises a seven-segment two-digit type of numeric display 34 comprising light-emitting diodes, for example, and red and green light-emitting diodes 35 and 36. The red light-emitting diode 35 of the display section 30 lights while the power battery 60 of the electric vehicle is being charged. The green light-emitting diode 36 lights instead of the red light-emitting diode 35 when the charging is completed. The numeric display 34 selectively displays either an elapsed time period from the initiation of the charging operation or a remaining capacity of the power battery 60 of the electric vehicle. The display mode change-over switch 33 is operable to select either one of the displays (elapsed time period or remaining capacity).

FIG. 3 shows an electrical system of the charging connector assembly, namely a circuit for the display section 30. A power battery charging circuit 40 is provided in the body of the electric vehicle. The power battery charging circuit 40 includes a rectifier circuit 41 rectifying an alternate current from a commercial power source 50 provided externally of the electric vehicle. The power battery charging circuit 40 further includes a current detecting circuit 42, a voltage detecting circuit 43 and a charge control circuit 44. The current detecting circuit 42 detects a charging current supplied to the power battery 60, thereby generating a signal indicative of the detected current. The voltage detecting circuit 43 detects a terminal voltage of the power battery 60, thereby generating a signal indicative of the detected voltage. Based on the signals from the current and voltage detecting circuits 42, 43, the charge control circuit 44 controls a DC output voltage of the rectifier circuit 41 so that the power battery 60 is charged in a predetermined charging pattern. Short-circuiting terminals 37 are provided in the charging connector 20. When the charging connector 20 is mated with the vehicle side connector 10, a pair of detection terminals 45a and 45b (shown only in FIG. 3) provided in the vehicle side connector 10 are short-circuited by the short-circuiting terminals 37, i.e. the terminal 45a is shorted to ground. When the short circuit occurs, the charge control circuit 44 detects that the charging connector 20 is properly attached to the vehicle side connector 10, with the result that the power battery 60 can be charged. The switch 32 is then turned on so that the charging is initiated. The above-described detection terminals 45a and 45b can be configured to be connected to the short-circuiting terminals 37 prior to the external electrodes 25 becoming connected to the respective vehicle side electrodes 13 during the attachment of the charging connector 20 to the vehicle side connector 10.

An output line Q1 of the charge control circuit 44 is maintained at a high level with another output line Q2 at a low level while the power battery 60 is being charged. Upon completion of the charging, the output line Q1 is brought to the low level and the output line Q2 is brought to the high level. The output line Q1 is connected to the red light-emitting diode 35 of the display section 30 of the charging connector 20 while the output line Q2 is connected to the green light-emitting diode 36, as shown in FIG. 3.

An analog voltage corresponding to the terminal voltage of the power battery 60 detected by the voltage detecting circuit 43 is delivered from an output line Q3 of the charge control circuit 44. The delivered analog voltage is supplied to a charge information display circuit 70 provided on the circuit board 31 of the display section 30, which circuit 70 is shown in detail in FIG. 4. The analog voltage from the charge control circuit 44 is supplied to an analog-to-digital converter circuit 71, which converts the analog voltage to a corresponding digital voltage. The charge information display circuit 70 also generates a signal indicative of the remaining capacity of the power battery 60 on the basis of a digital voltage value. Data corresponding to the signal indicative of the remaining capacity is supplied through a display controller 72 to the seven-segment numeric display 34, which displays the remaining capacity in numeric form.

Obtaining the data of the remaining capacity of the power battery 60 will now be described. Characteristic curves showing the relation between the terminal voltage of the power battery during the charging operation and the remaining capacity thereof are known and differ depending upon the type of power battery. A memory 73 is provided for memorizing tabulated data of a respective one of these characteristic curves. A readout circuit 74 reads out data of the remaining capacity from the memory 73 on the basis of the detected terminal voltage of the power battery 60. The charge information display circuit 70 further includes a timer circuit 75 having a well known timing function of dividing clock signals to measure lapse of time. The timer circuit 75 measures a period of time elapsed from the time the output line Q1 of the charge control circuit 44 is brought from the low level to the high level or the time the charge for the power battery 60 is initiated. The elapsed time period measured by the timer circuit 75 is displayed on the numeric display 34 instead of the remaining capacity of the power battery 60 when the display change-over switch 33 is turned on.

The power battery 60 of the electric vehicle is charged by use of the above-described charging connector 20 in the following manner. First, the connector holder 21 of the charging connector 20 is grasped with one hand and then, the distal end of the external connector housing 22 is moved onto the cylindrical guide 11 of the vehicle side connector 10. Then, the sleeve 27 is rotated in the clockwise direction with the charging connector 20 being slightly urged forward, until the engagement pin 28 of the sleeve 27 slips into one of the spiral grooves 14 of the vehicle side connector 10, and moves along the groove. Consequently, the external connector housing 22 is inserted in the cylindrical guide 11 of the vehicle side connector 10 such that the external electrodes 25 of the charging connector 20 are connected to the respective vehicle side electrodes 13 of the connector 10 and, the signal terminals 26 of the charging connector 20 are connected to the signal terminals of the connector 10, and the short-circuiting terminals 37 are connected to the detection terminals 45a and 45b. The charging and vehicle side connectors 20, 10 are thus mated together completely.

The charge switch 32 of the connector holder 21 is then turned on such that the AC power from the commercial AC power source 50 is rectified by the rectifier circuit 41 and then supplied to the power battery 60. The charging of the power battery 60 is thus initiated. Since the output line Q1 of the charge control circuit 44 is brought to the high level upon the initiation of the charging operating, the timer circuit 25 is activated and the red light-emitting diode 35 of the display section 30 of the charging connector 20 is lighted to indicate initiation of charging.

The charging current and the terminal voltage vary gradually with the progressive charging of the power battery 60. The gradually varying charging current and terminal voltage are detected by the current and voltage detecting circuits 42, 43 respectively. The charge control circuit 44 adjusts the DC output voltage of the rectifier circuit 41 so that the power battery 60 is properly charged. Furthermore, since the remaining capacity of the power battery 60 can be obtained on the basis of the terminal voltage thereof, the charge information display circuit 70 causes the numeric display 34 to display the remaining capacity of the power battery 60. When the display mode change-over switch 33 is in the ON state, the time period elapsed from the initiation of charging is displayed on the numeric display 34. When it is determined, on the basis of the charging current and the terminal voltage, that the power battery 60 has been charged, the charge control circuit 44 causes the rectifier circuit 41 to stop its operation, whereupon the output line Q1 is brought to the low level while the output line Q2 is brought to the high level. Consequently, the red light-emitting diode 35 is turned off while the green light-emitting diode 36 is turned on. Accordingly, the operator will readily comprehend that the charging of the power battery is completed. The charge switch 32 of the connector holder 21 is then turned off and the charging connector 20 is detached from the vehicle side connector 10.

According to the above-described embodiment, the charging connector 20 safely and reliably connects the commercial AC power source 50 and the charging circuit 40 provided in the electric vehicle. Moreover, since the display section 30 is provided in the connector holder 21 for displaying information concerning the charging condition(s), the charging connector 20 can reliably inform the operator as to whether charging has been initiated, whether charging has been completed, the remaining capacity of the power battery 60, and the time elapsed from the initiation of the charging operation. Accordingly, the operator can readily determine whether the power battery is being charged by merely looking at the display section 30. Furthermore, since the operator can readily obtain information about the time elapsed after the initiation of the charging operation and the remaining capacity of the power battery, the charging operation can be performed safely and reliably.

Furthermore, since the charging switch 32 is provided on the connector holder 21, charging can be initiated and interrupted at the charging connector which is convenient.

The present invention is not limited to the specifics of the foregoing embodiment described with reference to FIGS. 1 to 5. For instance, in the foregoing embodiment the display section 30 displays information as to whether the charging operation has been initiated, whether the charging has been completed, the remaining capacity of the power battery 60, and the time elapsed from the initiation of the charging operation. However, the display section 30 need not be capable of displaying all of such information. Rather, one or more pieces of this information may be displayed. Furthermore, the information displayed on the display section 30 is not limited to the above-described pieces of information. For example, the display section 30 may display a message indicative of the time at which the power battery is to be replaced or operating procedures necessary for charging.

Although the display section 30 comprises the light-emitting diodes and the seven-segment type of numeric display in the foregoing embodiment, a liquid-crystal display may be employed for displaying the information in characters or pictograph, instead.

In the foregoing embodiment, the seven-segment type of numeric display 34 is provided for displaying, in the form of a numeric value, the remaining capacity of the power battery and the time period elapsed after the initiation of the charging operation. Alternatively, a plurality of light-emitting diodes 70 may be arranged in a row in a modified form as shown in FIG. 6, or an array 71 of light-emitting diodes may be employed for displaying the information in an analog mode, as is shown as another modified form in FIG. 7.

Although the remaining capacity of the power battery is obtained on the basis of its terminal voltage in the foregoing embodiment, it may be obtained on the basis of discharge information including discharge current stored in the vehicle and discharge duration.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. An electric vehicle charging connector assembly for use in charging a power battery provided in a body of an electric vehicle with an external power source, the connector assembly comprising:

a) a vehicle side connector housing provided on the body of the electric vehicle;

b) vehicle side electrodes disposed in the vehicle side connector housing and electrically connected to the power battery;

c) a grip handle having a cavity therein and being capable of being gripped by an operator, the grip handle comprising an upper half portion, a lower half portion and an end;

d) an external connector housing provided on the end of the grip handle and configured to mate with the vehicle side connector housing;

e) external electrodes disposed in the external connector housing, said external electrodes being electrically connected to the vehicle side electrodes when the external connector housing is mated with the vehicle side connector housing;

f) a charging information display circuit operatively connected to the power battery while said external electrodes are connected to said vehicle side electrodes;

g) a power cable connected to the external electrodes, the power cable extending through the cavity of the grip handle from the external electrodes and down and out of the lower half portion of the grip handle; and h) a display disposed on the upper half portion of the grip handle, said display being operatively connected to said display circuit so as to display information generated by the display circuit when said external connector housing is mated with the vehicle side connector housing.

2. A connector assembly according to claim 1, wherein the charging information display circuit comprises a memory storing data of relation between the terminal voltage and a remaining capacity of the power battery, and a readout circuit which reads out from the memory the data of the remaining capacity in accordance with a terminal voltage of the power battery so that the remaining capacity can be displayed by the display.

3. A connector assembly according to claim 2, wherein the display is a numeric display comprising a plurality of display elements arranged in the form of numerals such that the remaining capacity will be displayed in the form of numerals by the display.

4. A connector assembly according to claim 2, wherein the display comprises a plurality of display elements arranged in a row, the number of the display elements lighting up corresponding to the remaining capacity of the power battery.

5. A connector assembly according to claim 1, wherein the charging information display circuit comprises a timer circuit which measures the time elapsed from an initiation of the charging of the power battery such that the elapsed time measured by the timer circuit can be displayed by the display.

6. A connector assembly according to claim 5, wherein the display is a numeric display comprising a plurality of display elements arranged in the form of numerals such that the remaining capacity will be displayed in the form of numerals by the display.

7. A connector assembly according to claim 5, wherein the display comprises a plurality of display elements arranged in a row, the number of the display elements lighting up corresponding to the elapsed time measured by the timer circuit.

8. An electric vehicle charging system for use in charging a power battery provided in a body of an electric vehicle with an external power source, the system comprising:

a) a power battery charging circuit disposed in the vehicle and a rectifier circuit having an output operatively coupled to the power battery, a voltage detector circuit having an input operatively coupled to the power battery, and a charge control circuit having an input operatively coupled to an output of the voltage detector and having an output which is responsive to the output of the voltage detector operatively coupled to a control input of the rectifier circuit, thereby controlling the charging of the power battery;

b) a vehicle side connector housing provided on the body of the electric vehicle;

c) vehicle side electrodes disposed in the vehicle side connector housing, said vehicle side electrodes being operatively connected to said power battery charging circuit;

d) an external connector housing configured to mate with the vehicle side connector housing;

e) external electrodes disposed in the external connector housing, said external electrodes being electrically connected to the vehicle side electrodes when the external connector housing is mated with the vehicle side connector housing;

f) a charging information display circuit operatively connected to said vehicle side electrodes while said external electrodes are connected to said vehicle side electrodes; and g) a display disposed on the external connector housing, said display being operatively connected to said display circuit so as to display information indicative of the charging of the power battery when said external electrodes are electrically connected to the vehicle side electrodes.

9. A charging connector for use in charging a power battery of an electric vehicle with an external power source, said charging connector comprising:

a) a connector holder comprising a grip handle and having a hollow portion;

b) an external connector housing mounted to the connector holder at one end of the hollow portion thereof;

c) external electrodes disposed in the connector housing;

d) a power cable extending through the hollow portion of said connector holder and operatively connected to said external electrodes; and e) a display section mounted to said connector holder, said display section being connected to said external electrodes, and said display section including a display exposed at an outer surface of said connector holder.

10. A charging connector as claimed in claim 9, wherein said external connector housing includes an outer sleeve rotatable relative to the connector holder, and an inner casing fixed relative to said connector holder, said external electrodes being disposed in said inner casing.

11. A charging connector as claimed in claim 9, wherein said display section includes a display controller connected to said display, and an electronic timer connected to said display controller, said display being controlled by said controller to display time measured by said timer.

12. A charging connector as claimed in claim 9, wherein said display section includes a memory storing data of a relation between a terminal voltage and a remaining capacity of a power battery, a display controller connected to said display, and a readout circuit selectively supplying the data stored in said memory to said display controller.

13. A charging connector as claimed in claim 9, wherein said display section includes a display controller electrically connected to said display, an electronic timer electrically connected to said display controller, a memory storing data representative of a condition of a power battery, and a readout circuit selectively supplying the data stored in said memory to said display controller.

14. A charging connector as claimed in claim 9, wherein said display section further comprises a switch operatively connected to said display controller to cause said display controller to selectively cause said display to display time measured by said timer and data read out from said memory.

* * * * *